United States Patent

[11] 3,624,176

| [72] | Inventors | Pierre Lhonore<br>Douai;<br>Jacques Quibel, Maisons-Laffitte; Michel<br>Senes, Saint-Nazaire, all of France |
|---|---|---|
| [21] | Appl. No. | 835,784 |
| [22] | Filed | June 23, 1969 |
| [45] | Patented | Nov. 30, 1971 |
| [73] | Assignee | Societe Chimique de la Grande Paroisse,<br>Azote et Produits Chimiques |
| [32] | Priority | June 25, 1968 |
| [33] | | France |
| [31] | | 156456 |

[54] CATALYTIC PROCESS FOR PRODUCING GAS MIXTURES HAVING HIGH ETHYLENE CONTENTS
9 Claims, No Drawings

[52] U.S. Cl. .................................................. 260/683 R,
73/212, 23/214, 208/153, 208/163
[51] Int. Cl. ............................................................ C07c 3/34,
C07c 11/02, C10q 13/18
[50] Field of Search............................................ 260/683;
23/212 R, 214, 212; 208/153, 163; 252/457, 462, 475

[56] References Cited
UNITED STATES PATENTS

| 2,986,532 | 5/1961 | Gosselin .......................... | 252/457 |
| 3,205,281 | 9/1965 | Fleming et al. ................. | 260/683 |
| 3,238,271 | 3/1966 | Nonnenmacher et al..... | 260/683 |
| 3,353,916 | 11/1967 | Lester ............................ | 252/462 |
| 3,457,192 | 7/1969 | Housset et al. ................ | 252/457 |
| 3,483,138 | 12/1969 | Stephens ....................... | 252/462 |

*Primary Examiner*—Delbert E. Gantz
*Assistant Examiner*—C. E. Spresser
*Attorney*—Browdy and Neimark ABSTRACT: Process for the catalytic steam reforming in a fluidized bed of light and heavy hydrocarbons, with the object of obtaining mixtures with a high ethylene and propylene content, in which the reforming in a fluidized bed is carried out under a pressure capable of reaching 50 bars absolute, in the presence of stable catalyst compositions without dehydrogenating metal or little dehydrogenating metal, composed of refractory oxides of limited porosity and with specific surfaces which are between 0.02 and 10 $m^2/g.$, with a grain size between $50\mu$ and 5 mm., resistant to the temperatures of the fluidized bed which are between 650° and 900° C. and to the pressure, without regeneration of the said compositions.

CATALYTIC PROCESS FOR PRODUCING GAS MIXTURES HAVING HIGH ETHYLENE CONTENTS

This invention relates to the catalytic treatment of hydrocarbons and more particularly, is concerned with a catalytic process for producing gas mixtures having high ethylene and/or propylene contents.

Industrial processes for the thermal treatment of hydrocarbons with the object of preparing ethylene are known. Strictly thermal processes have the disadvantage of causing deposits of carbon and gums in the tubes and conduit pipes of the installation in which the process is being carried out. U.S. Pat. No. 2,986,532 describes the thermal treatment of vaporized hydrocarbons in a fixed bed of a catalyst comprising a mixture of nondehydrogenating and nonreducible oxides. However, this process requires the use of low pressures and does not permit high yields of ethylene to be achieved.

The steam catalytic reforming process of the invention makes it possible to obtain at various operating pressures, in good yields, gaseous mixtures having a high ethylene content, the process being applicable to a wide range of hydrocarbons, for example the light petroleum fractions, the light and heavy naphthas, and the heavy hydrocarbons, e.g. paraffinic fuels and distillates, which hydrocarbons may contain up to 3 or 4 percent of sulfur.

In one embodiment of the invention the catalytic reforming is carried out in a fluidized bed at a temperature in the range 650° to 900° C., under a pressure up to 50 bars absolute and in the presence of a stable granular catalyst composition which contains no dehydrogenating metal or only a slightly dehydrogenating metal and which is composed of refractory oxides of limited porosity and a specific surface which is in the range of from about 0.02 to about 10 m.²/g. and which has a grain size which is in the range of from 50 $\mu$ to 5,000 $\mu$, the catalyst being resistant to the temperatures and pressures being used and not requiring regeneration.

Certain of the catalyst compositions used in the process of the invention contain at least one rare earth oxides, of which the calculated content as regards oxide is between about 1 and about 4 percent, in association with a mixture of refractory oxides comprising from about 30 percent to about 70 percent by weight magnesium oxide from about 25 percent to about 40 percent by weight of zirconium dioxide. Each of the rare earth oxides is suitable, but it is preferred to use neodymium, cerium or lanthanum oxide.

It has been observed that certain of the catalyst compositions used in the process of the invention can with advantage contain a small amount by weight of an oxide which can be reduced, for example the oxides of iron, e.g. ferrous and ferric oxides. This reducible oxide imparts to the catalyst composition stability with respect to ethylene. These latter compositions preferably contain a magnesium oxide content, which is between 50 and 70 percent by weight and represents the largest proportion of the refractory oxides, and an aluminum oxide content not greater than 20 percent by weight.

The stable catalyst compositions used in the process of the invention for the preparation of ethylene by steam reforming hydrocarbons can be prepared by diffused solution in the mass, preferably effected by sintering at a high temperature which is advantageously at least equal to 1,300° C.

The grain size of the catalyst compositions suitable for obtaining a satisfactory conversion of the hydrocarbons into ethylene is preferably between 50 $\mu$ and 5 mm. and more preferably in the range 200 $\mu$ to 3 mm. It is varied as a function of the rate of flow of gas and is adapted to the volume of the reactor, so as to be able to fluidize as a function of the flow velocity of the reaction mixture.

When the catalytic reforming in a fluidized bed according to the invention is carried out under a pressure of 1 to 50 bars, particularly 5 to 30 bars there is advantageously used steam to carbon ratios, calculated by weight, which range from 0.5 to 4, and preferably from 1 to 3. Steam to carbon ratios close to the stoichiometric ratio lead to good results.

The catalyst bed is brought into a fluid suspension by the flow of the reactants of the reforming process. In order to be able to carry out the present invention in advantageous manner, the reforming mixture will be fed towards the fluidized catalyst bed at a temperature which is in the range of from 200° to 600° C., preferably from 250° to 550° C. The temperature of the fluidized bed is preferably between 650° and 900° C. and most preferably between 700° and 850° C.

The process according to the invention, in which the reforming reaction is completed without the formation of free carbon, offers the advantage of greatly simplifying the operation in as much as the stages for purifying the hydrocarbons before treatment and the regeneration of the catalyst can be omitted. It is also of additional interest that losses of hydrocarbon due to the formation of free carbon are avoided. Losses of catalyst caused by the regeneration and the circulation of the catalyst outside the reforming zone are also avoided. The absence of circulation of the catalyst particles permits industrial operation without any particular difficulties, when operating under pressure.

The recycling or the addition of methane or ethane increase the ethylene yield.

Examples which illustrate the invention in a nonlimiting manner are given below:

EXAMPLE I

There was treated in a reaction tube with an internal diameter of 80 mm. and a height of 480 mm., containing 520 ml. of catalyst, i.e. 640 g., having a grain size of 250 to 630 $\mu$, a light petroleum fraction of the empirical formula $C_{5.69}H_{13.10}$, known as light naphtha, of a density of 0.66 and containing 20 p.p.m. of sulfur.

The catalyst composition was of the type:

| | |
|---|---|
| Magnesium oxide-MgO | 54.5 |
| Calcium oxide-CaO | 7.87 |
| Silicon dioxide-$SiO_2$ | 0.54 |
| Ferrous oxide-$Fe_2O_3$ | 0.74 |
| Aluminum oxide | 15.50 |
| Zirconium dioxide | 1.60 |
| Potassium oxide | 1.75 |
| Chromium oxide | 0.48 |
| Ferric oxide | 0.99 |

A series of tests was carried out at atmospheric pressure. Rates of flow of hydrocarbon and steam, steam to carbon ratios, the temperatures of the catalyst bed and the compositions of the effluent gas are set out in the following table I.

TABLE I

| Entry flows | | | | Exit flows | | | | | | | | |
|---|---|---|---|---|---|---|---|---|---|---|---|---|
| Hydrocarbon, ml./l. | $H_2O$ liquid, ml./l. | $H_2O$/C, mole atom | Temp. of bed, °C. | Gas, l./h. | Residue | Composition of effluent gas in percent | | | | | | |
| | | | | | | $H_2$ | CO | $CO_2$ | $CH_4$ | $C_2H_6$ | $C_2H_4$ | $H_2+>C_2$ |
| 420 | 555 | 1.3 | 750 | 208 | Nil | 0.3 | 0.6 | 6.4 | 19.4 | 1.9 | 26.3 | 45.1 |
| 420 | 555 | 1.3 | 750 | 236 | Nil | 0.3 | 1.0 | 6.5 | 20.9 | 1.8 | 28.1 | 41.4 |
| 420 | 555 | 1.3 | 750 | 256 | Nil | 0.3 | 0.9 | 6.4 | 19.7 | 1.9 | 26.9 | 43.9 |
| 420 | 555 | 1.3 | 750 | 234 | Nil | 0.3 | 1.1 | 6.4 | 20.5 | 1.9 | 27.7 | 42.1 |
| 420 | 555 | 1.3 | 750 | 248 | Nil | 0.6 | 1.0 | 6.9 | 17.7 | 1.9 | 24.2 | 47.6 |
| 420 | 555 | 1.3 | 750 | 230 | Nil | 0.2 | 0.8 | 6.3 | 18.1 | 1.9 | 24.7 | 48.0 |
| 420 | 555 | 1.3 | 750 | 224 | Nil | 1.9 | 0.8 | 6.1 | 16.7 | 1.9 | 23.5 | 12.7 |
| 420 | 555 | 1.3 | 750 | 225 | Nil | 1.7 | 1.1 | 6.6 | 17.1 | 1.8 | 24.0 | 47.7 |
| 380 | 555 | 1.4 | 750 | 256 | Nil | 3.1 | 1.9 | 8.1 | 19.4 | 1.8 | 25.4 | 20.3 |
| 380 | 555 | 1.4 | 750 | 242 | Nil | 1.5 | 1.1 | 7.1 | 17.6 | 1.8 | 24.4 | 46.5 |
| 380 | 555 | 1.4 | 750 | 238 | Nil | 1.4 | 1.7 | 7.9 | 13.9 | 1.8 | 25.3 | 19.0 |
| 380 | 555 | 1.4 | 750 | 224 | Nil | 1.4 | 0.9 | 6.1 | 17.1 | 1.8 | 24.6 | 48.1 |
| 380 | 562 | 1.4 | 750 | 210 | Nil | 0.7 | 5.0 | 11.5 | 16.5 | 1.3 | 19.0 | 45.9 |
| 380 | 562 | 1.4 | 800 | 347 | Nil | 0.9 | 3.8 | 10.2 | 17.8 | 1.5 | 21.1 | 44.6 |
| 380 | 562 | 1.4 | 800 | 331 | Nil | 0.8 | 4.2 | 10.2 | 17.2 | 1.5 | 20.9 | 44.9 |
| 380 | 562 | 1.4 | 750 | 146 | Nil | 1.5 | 0.4 | 5.7 | 13.1 | 1.5 | 18.9 | 58.8 |

EXAMPLE II

There was treated in a reaction tube having an internal diameter of 80 mm. and a height of 480 mm., containing 520 ml., i.e. 640 g., of catalyst having a grain size in the range of from 250 to 630 $\mu$ and having the composition:

| | | |
|---|---|---|
| Neodumium oxide | $Nd_2O_3$ | 2.1 |
| Magnesium oxide | MgO | 36 |
| Silicon dioxide | $SiO_2$ | 16.8 |
| Zirconium dioxide | $ZrO_2$ | 43.8 |
| Calcium oxide | CaO | 1 |
| Aluminum oxide | $Al_2O_3$ | 0.3 | a light petroleum fraction having the same composition as that of the preceding example.

A series of tests was carried out at atmospheric pressure. Rates of flow of hydrocarbons, steam, hydrogen, and nitrogen, steam to carbon ratios, the temperatures of the catalyst bed and the compositions of the departing gas are set out in the following table II.

TABLE II

| Entry flows | | | | | Exit flows | | Composition of reformed gas in percent | | | | | | |
|---|---|---|---|---|---|---|---|---|---|---|---|---|---|
| Hydrocarbon, ml./l. | $H_2O$ liquid, ml./l. | Carrier gas | $H_2O/C$, mole atom | Temp. of bed, °C. | gas, l./h. | Residue | $N_2$ | CO | $CO_2$ | $CH_4$ | $C_2H_6$ | $C_2H_4$ | $(H_2+>C_2)$ |
| 304 | 432 | Carrier gas | 1.4 | 753 | 355 | Residue | 7.6 | 7.1 | 19.3 | 1.5 | 17.7 | | 46.6 |
| 244 | 478 | ...do | 1.9 | 753 | 237 | None | 6.7 | 5.7 | 20.1 | 1.4 | 20.5 | | 45.3 |
| 244 | 478 | ...do | 1.9 | 753 | 232 | ...do | 7.5 | 6.6 | 19.9 | 1.3 | 19.8 | | 44.7 |
| 270 | 432 | ...do | 1.5 | 753 | 221 | ...do | 6.9 | 5.2 | 21.3 | 1.5 | 22.0 | | 42.8 |
| 280 | 420 | ...do | 1.4 | 753 | 251 | ...do | 6.3 | 4.3 | 21.5 | 1.6 | 22.5 | | 43.6 |
| 314 | 405 | ...do | 1.2 | 753 | 239 | Light | 6.3 | 4.8 | 21.6 | 1.9 | 22.8 | | 42.3 |
| 314 | 400 | ...do | 1.2 | 753 | 274 | ...do | 7.1 | 5.1 | 23.3 | 1.8 | 22.9 | | 39.6 |
| 314 | 400 | ($H_2$) 5.1 | 1.2 | 753 | 274 | ...do | 8.0 | 6.2 | 24.2 | 1.7 | 22.2 | | 32.4 |
| 314 | 400 | ($H_2$) 5.1 | 1.2 | 800 | 274 | ...do | 12.9 | 7.9 | 15.3 | 1.1 | 11.5 | | 51.2 |
| 314 | 415 | ($H_2$) 5.1 | 1.3 | 720 | 238 | ...do | 4.0 | 4.9 | 23.9 | 2.0 | 25.0 | | 39.6 |
| 314 | 420 | ($H_2$) 22.0 | 1.3 | 720 | 183.8 | ...do | 2.5 | 3.7 | 22.4 | 2.1 | 26.4 | | 17.3 |
| 304 | 420 | | 1.3 | 720 | 240 | ...do | 3.9 | 4.0 | 22.2 | 1.8 | 24.4 | | 3.4 |
| 304 | 420 | 2.3 | 1.3 | 720 | 176.5 | ...do | 1.6 | 3.1 | 20.3 | 2.2 | 25.9 | | 5.2 |
| 300 | 420 | | 1.3 | 800 | 250 | None | 4.8 | 6.5 | 18.8 | 2.0 | 21.9 | | 46.0 |
| 300 | 420 | | 1.4 | 800 | 220 | ...do | 5.8 | 7.7 | 14.6 | 1.6 | 16.9 | | 51.8 |
| 300 | 420 | | 1.4 | 800 | 230 | ...do | 4.8 | 7.3 | 14.6 | 1.6 | 16.9 | | 51.8 |
| 300 | 420 | | 1.4 | 800 | 230 | ...do | 5.0 | 6.9 | 17.7 | 1.8 | 20.8 | | 45.3 |
| 300 | 420 | | 1.4 | 800 | 260 | ...do | 5.0 | 6.8 | 15.5 | 1.7 | 17.9 | | 47.3 |
| 300 | 420 | | 1.4 | 800 | 240 | ...do | 5.2 | 7.2 | 15.9 | 1.7 | 17.7 | | 49.3 |
| 300 | 420 | ($N_2$) 5.7 | 1.4 | 800 | 236 | ...do | 7.1 | 8.1 | 15.6 | 1.8 | 16.7 | | 36.1 |

EXAMPLE III

There was treated in a reaction tube having an internal diameter of 80 mm. and a height of 860 mm., containing 800 ml. of the catalyst referred to in example 2, having a grain size 250 to 630 $\mu$, a domestic fuel having the empirical formula $C_{15.6}H_{33.2}$ of the molecular weight 220, density 0.826 and sulfur content 0.35 percent.

A series of tests was carried out at atmospheric pressure, and the values of the rates of flow of hydrocarbon, steam and hydrogen, steam to carbon ratios, the temperatures of the catalyst bed and the compositions of the departing gas are set out in the following table III.

TABLE III

| Entry flows | | | | Temp. of bed, °C. | Exit flows | | Composition of reformed gas in percent | | | | | | |
|---|---|---|---|---|---|---|---|---|---|---|---|---|---|
| Fuel, ml./h. | $H_2O$ ml./l. | $H_2$, l./h. | $H_2O/C$ | | Gas, l./h. | Residue | $CH_4$ | $H_2$ | CO | $CO_2$ | $C_2H_4$ | $C_2H_6$ | $H_2+>C_2$ |
| 91 | 280 | 10 | 3.86 | 7.40 | 110 | None | 17.5 | 7.6 | 2.2 | 12.8 | 20.3 | 1.2 | 46 |
| 133 | 290 | 12 | 2.65 | 7.40 | 138 | 14.5 | 20.9 | 9.0 | 2.4 | 11.5 | 21.6 | 1.5 | 42 |
| 177 | 271 | 15 | 1.85 | 7.40 | 163 | 35 | 24.7 | 9.5 | 1.8 | 10.4 | 25.1 | 2.1 | 34.7 |
| 177 | 271 | 15 | 1.85 | 7.40 | 280 | 24 | 25.3 | 9.5 | 1.9 | 9.6 | 26.1 | 2.0 | 35.1 |
| 177 | 271 | 12 | 1.85 | 7.40 | 16 | 31.5 | 23.2 | 7.2 | 2.1 | 11.7 | 24.8 | 1.0 | 36.3 |
| 177 | 271 | 15 | 1.85 | 7.40 | 170 | 32.7 | 22.0 | 9.4 | 2.0 | 11.7 | 25.0 | 1.8 | 37 |

EXAMPLE IV

A light petroleum fraction of the empirical formula $C_{5.69}H_{13.10}$, known as light naphtha, having a density 0.66 and a boiling point between 40° and 110° C., was treated by reforming with steam in a fluidized bed of catalyst contained in a reaction tube with an internal diameter of 80 mm. and a height of 860 mm., containing 800 ml. of the catalyst referred to in example 2, having a grain size in the range of from 250 $\mu$ to 630 $\mu$.

A series of tests was carried out under pressure, in which the temperature of the fluidized bed was 740° C. The values of the rates of flow of hydrocarbons VvH, the steam ratios by weight and also the contents of ethylene, percentage by weight in the discharging gas and the residue by weight, are set out in table IV.

TABLE IV

| Pressure, bars | VvH | $H_2O/C$ by weight | Percent by weight | |
|---|---|---|---|---|
| | | | $C_2H_4$ | Residue |
| 1 | 0.13 | 3.0 | 34.3 | 13.5 |
| 10 | 1.3 | 3.0 | 32.6 | 24.0 |
| 15 | 2.0 | 3.0 | 32.8 | 23.7 |
| 20 | 2.6 | 3.0 | 33.2 | 24.1 |
| 25 | 2.6 | 3.8 | 33.5 | 23.1 |
| 30 | 2.6 | 4.5 | 35.9 | 21.0 |

Using the same type of light naphtha fraction as previously, the influence of the steam to carbon ratio on the ethylene yield for a reforming process carried out at 30 bars and with an hourly volumetric velocity of hydrocarbon VvH=3.0, and at a constant temperature of the fluidized bed and outlet temperature of 740° C. was studied. The results obtained are set out in the following table V.

TABLE V

| $H_2O/C$, by weight | Composition of gas on exit | | | | | | | By weight | |
|---|---|---|---|---|---|---|---|---|---|
| | $CO_2$ | CO | $CH_4$ | $C_2H_4$ | $C_2H_6$ | $C_3H_6$ | $H_2+C_3$ | $C_2H_4$ | Residue |
| 3.0 | 7.0 | 4.1 | 16.4 | 21.0 | 1.9 | 10.6 | 39.0 | 36.4 | 21.2 |
| 2.5 | 6.2 | 3.6 | 18.1 | 22.6 | 1.9 | 10.6 | 37.0 | 34.5 | 24.0 |
| 2.0 | 5.2 | 3.0 | 19.8 | 24.0 | 2.0 | 10.5 | 35.5 | 32.1 | 26.5 |
| 1.7 | 4.6 | 2.6 | 21.1 | 25.0 | 2.2 | 10.5 | 34.0 | 30.3 | 29.2 |
| 1.5 | 3.9 | 2.0 | 22.3 | 25.9 | 2.4 | 10.3 | 33.2 | 27.9 | 31.8 |
| 1.3 | 3.4 | 1.7 | 23.2 | 26.8 | 2.6 | 10.2 | 32.1 | 25.7 | 34.7 |

EXAMPLE V

A gois oil having a density of 0.826 and boiling point in the range of from 193° C. to 365° C. was treated by reforming in a fluidized bed of catalyst contained in a reaction tube with an internal diameter of 80 mm. and a height of 860 mm., containing 800 ml. of the catalyst composition referred to in example 2, with a grain size of 250 to 630 $\mu$.

A series of tests was carried out under pressure, in which the steam to carbon ratio $H_2O/C$ by weight was 3.0. The value of the rates of flow of gas oil, VvH, the temperatures of the fluidized bed, and the ethylene contents as a percentage by weight in the effluent gas and the residue by weight, are set out in the following table VI.

TABLE VI

| Pressure, bars | VvH | Temp. of fluidised bed in °C. | Percent by weight | |
|---|---|---|---|---|
| | | | $C_2H_4$ | Residue |
| 1 | 0.09 | 740 | 31.4 | 15.5 |
| 10 | 0.9 | 760 | 30.8 | 27.5 |
| 15 | 1.3 | 760 | 31.0 | 29.0 |
| 20 | 1.8 | 770 | 30.8 | 29.5 |
| 25 | 2.2 | 770 | 31.2 | 31.0 |
| 30 | 2.7 | 800 | 31.0 | 31.0 |

What we claim is:

1. Process of manufacturing ethylene and propylene by the catalytic steam reforming in a fluidized bed of light and heavy hydrocarbons, comprising reforming said hydrocarbons in a fluidized bed under a pressure of about 5 to 50 bars absolute, in the presence of stable catalyst compositions without dehydrogenating metal, prepared by solution diffused into the mass carried out by sintering at high temperature of a mixture of refractory oxides, comprising from about 30 percent to about 70 percent by weight of magnesium oxide, the remainder being at least one member selected from the group consisting of zirconium dioxide, aluminum oxide and silicon dioxide, and with specific surfaces which are between 0.02 and 10 m.²/g., with a grain size between 50 and 5 mm., resistant to the temperatures of the bed which are between 650° and 900° C. and to the pressure, without regeneration of the said compositions.

2. A process in accordance with claim 1, in which the steam reforming is carried out in the presence of a catalyst composition containing at least one metal of a group formed by the rare earths, of which the content calculated as oxide is between 1 and 4 percent by weight, in association with a mixture of refractory oxides rich in magnesium oxide, of which the content by weight is between 30 and 70 percent, and containing zirconium dioxide, of which the content by weight is between 25 and 40 percent, the total catalyst composition equaling 100 percent by weight.

3. A process in accordance with claim 1, in which the steam reforming is effected in the presence of a catalyst composition containing a small content by weight up to about 1.75 percent of an oxide which can be reduced, selected from the group consisting of ferrous oxide $Fe_2O_3$, ferric oxide $Fe_3O_4$, and mixtures thereof.

4. A process in accordance with claim 1, in which the steam reforming is effected in the presence of a catalyst composition containing a small content by weight up to about 1.75 percent of an oxide which can be reduced, selected from the group consisting of ferrous oxide $Fe_2O_3$, ferric oxide $Fe_3O_4$ and a high content of magnesium oxide which content is between 50 and 70 percent by weight, and which represents the major proportion of the refractory oxides, the content of aluminum oxide being at most equal to 20 percent by weight and the total catalyst composition equaling 100 percent by weight.

5. Catalytic reforming process in a fluidized bed, according to claim 1, in which the reforming mixture is introduced on to the catalyst at a temperature which is between 200° and 600° C.

6. Catalytic reforming process in a fluidized bed, according to claim 1, in which the temperature of the fluidized bed is between 700° and 850° C.

7. Catalytic reforming process in a fluidized bed, according to claim 1, in which the steam ratio $H_2O/C$, calculated by weight, is between 0.5 and 4.

8. A process in accordance with claim 5 wherein said reforming mixture is introduced to the catalyst at a temperature between 250° and 550° C.

9. A process in accordance with claim 7 wherein said steam ratio $H_2O/C$ is between 1 and 3.

* * * * *

UNITED STATES PATENT OFFICE
CERTIFICATE OF CORRECTION

Patent No. 3,624,176      Dated November 30, 1971

Inventor(s) Pierre LHONORE et al.

It is certified that error appears in the above-identified patent and that said Letters Patent are hereby corrected as shown below:

Column 2, line 11, after "ratios," insert $--\frac{H_2O}{C}--$

Column 4, line 7, after "weight" insert $--\frac{H_2O}{C}--$

Signed and sealed this 3rd day of October 1972.

(SEAL)
Attest:

EDWARD M. FLETCHER, JR.
Attesting Officer

ROBERT GOTTSCHALK
Commissioner of Patents